United States Patent [19]

Andrieux

[11] Patent Number: 4,533,260

[45] Date of Patent: Aug. 6, 1985

[54] POSITIONING AND PLAY-COMPENSATING DEVICE FOR THE SHAFT OF AN ELECTRIC MOTOR

[75] Inventor: Raymond Andrieux, Meudon, France

[73] Assignee: Valeo, Paris, France

[21] Appl. No.: 578,655

[22] Filed: Feb. 9, 1984

[30] Foreign Application Priority Data

Feb. 17, 1983 [FR] France ............................... 83 02610

[51] Int. Cl.³ .............................................. F16C 25/04
[52] U.S. Cl. .................... 384/206; 384/222; 310/90
[58] Field of Search ............ 310/90, 51; 384/223, 384/206, 207, 208

[56] References Cited

U.S. PATENT DOCUMENTS

| | | | |
|---|---|---|---|
| 2,353,763 | 7/1944 | Rodman | 384/223 |
| 2,885,236 | 5/1959 | Carlson | 384/206 |
| 3,441,325 | 4/1969 | Sjotun | 384/249 |
| 4,245,870 | 1/1981 | Punshon | 310/90 |
| 4,309,062 | 1/1982 | Bischoff | 384/205 |

FOREIGN PATENT DOCUMENTS

| | | | |
|---|---|---|---|
| 1172357 | 6/1964 | Fed. Rep. of Germany | 310/90 |
| 1178934 | 10/1964 | Fed. Rep. of Germany | . |
| 1955166 | 5/1971 | Fed. Rep. of Germany | . |
| 2626609 | 12/1977 | Fed. Rep. of Germany | 384/223 |
| 1195665 | 11/1959 | France | . |
| 1328058 | 4/1963 | France | 310/90 |
| 2035734 | 12/1970 | France | . |
| 0021299 | 5/1963 | Japan | 310/51 |
| 0723194 | 2/1955 | United Kingdom | . |

Primary Examiner—R. Skudy
Attorney, Agent, or Firm—Dennison, Meserole, Pollack & Scheiner

[57] ABSTRACT

The shaft (18) of an electric motor is mounted at each end in a swivel bearing (22, 24). In order to take up the play which arises from mass-production tolerances, the shaft is held axially relative to one of the bearings (24) by means of a split ring (34) which is fixed to the shaft, a metal washer (36), a damping washer (38) made of rubber or like material, and a friction washer (40). The metal washer (36) includes axially directed projections which penetrate more or less deeply into the rubber depending on the amount of play or slack to be taken up.

6 Claims, 5 Drawing Figures

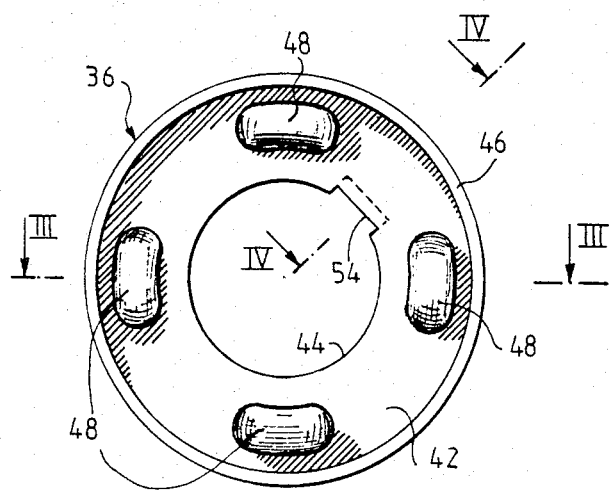
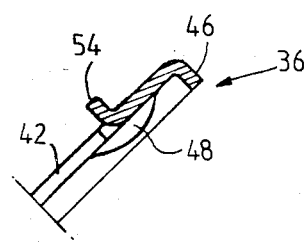
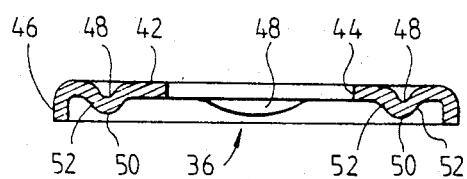
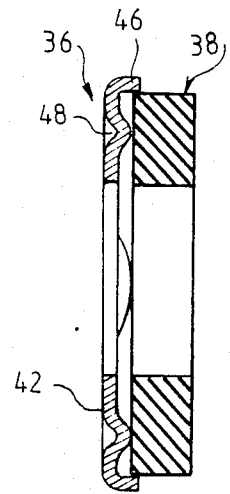

POSITIONING AND PLAY-COMPENSATING DEVICE FOR THE SHAFT OF AN ELECTRIC MOTOR

The invention relates to a positioning and play-compensating device for the shaft of an electric motor, which shaft is guided by bearings in the motor casing.

BACKGROUND OF THE INVENTION

The shaft of an electric motor is generally supported and guided at the ends of the motor casing by two swivel bearings held by the motor casing, with the shaft being free to move axially through one of the bearings while being restrained axially relative to the other bearing by means of two resilient stops, thereby reducing play and vibration when the electric motor is in operation.

It has already been proposed to make said resilient stops by means of lock washers threaded over the shaft on either side of the swivel bearing, and by means of washers having a low coefficient of friction interposed between the lock washers and the bearing. In known manner, lock washers comprise a peripheral ring having claws or tabs which extend radially inwardly and slightly obliquely relative to the plane of the ring in such a manner as to grip the peripheral surface of the motor shaft. However, it has been observed that such washers, when thrust to abut against friction washers pressing against the bearing, tend to tilt relative to a plane perpendicular to the axis of the shaft and then do not exert uniform thrust on the washers. This causes the shaft and the rotor to vibrate longitudinally relative to the motor casing.

It has also been proposed to make the stops by means of flat rings or spring clips which are fixed to the shaft against both axial movement and rotational movement by engaging in grooves made in the shaft on either side of the bearing. Washers made of rubber or like material are interposed together with friction washers between the bearing and the flat rings.

However, there is sufficient dispersion in dimensions due to the motor shafts and the various washers being mass produced for the shaft to be correctly positioned relative to the bearing in some cases only, while in some other cases there is play between the washer and the stops on the shaft giving rise to vibration and noise, and in further other cases the stops are too tightly pressed against the bearing, giving rise to heating and to excessive wear of the friction washers while at the same time reducing the performance and the efficiency of the electric motor.

Preferred embodiments of the present invention avoid these various drawbacks.

SUMMARY OF THE INVENTION

The present invention provides a positioning and play-compensating device for the shaft of an electric motor which shaft is guided in a swivel bearing held by the motor casing, said device including two radially split flat rings or spring clips fixed to the shaft on either side of the bearing with damping washers and friction washers interposed between the flat rings and the bearing, the improvement wherein at least one metal washer is mounted on the shaft, free to move axially between a corresponding one of said flat rings and a damping washer of rubber or like material, and wherein the face of said axially-free metal washer which is in contact with said damping washer includes axially directed projections suitable for penetrating to a variable distance into the material of the damping washer.

Thus, by means of the projections on the metal washer penetrating to an appropriate distance into the material of the damping washer which is made of rubber or like material, the dispersions in dimensions due to the various parts being mass produced are compensated and the shaft is correctly positioned relative to the swivel bearing, without play and without being pressed too tightly either.

Preferably, the above-mentioned metal washer has a cylindrical rim around its periphery into which a portion of said damping washer is received.

This helps to prevent the damping washer from deforming radially outwardly when it is compressed axially, which deformation would reduce its play-compensating capabilities.

Advantageously, the metal washer is fixed against rotation relative to said flat ring or spring clip by a lug which engages in a slot or notch in said flat ring.

Thus, when the shaft is rotated, the spring clip or flat ring rotates said metal washer together with the damping washer and the friction washer which is pressed against the bearing, thereby ensuring that the only friction caused by said rotation is friction between the bearing and the friction washer, which friction is very low by virture of the material from which the friction washer is made.

BRIEF DESCRIPTION OF THE DRAWINGS

An embodiment of the invention is described, by way of example, with reference to the accompanying drawings, in which:

FIG. 2 is an end view on a larger scale of a metal washer for use in a device in accordance with the invention;

FIGS. 3 and 4 are sections on lines III—III and IV—IV respectively in FIG. 2; and FIG. 5 is a section showing how a damping washer is mounted in a metal washer.

MORE DETAILED DESCRIPTION

Figure 1:
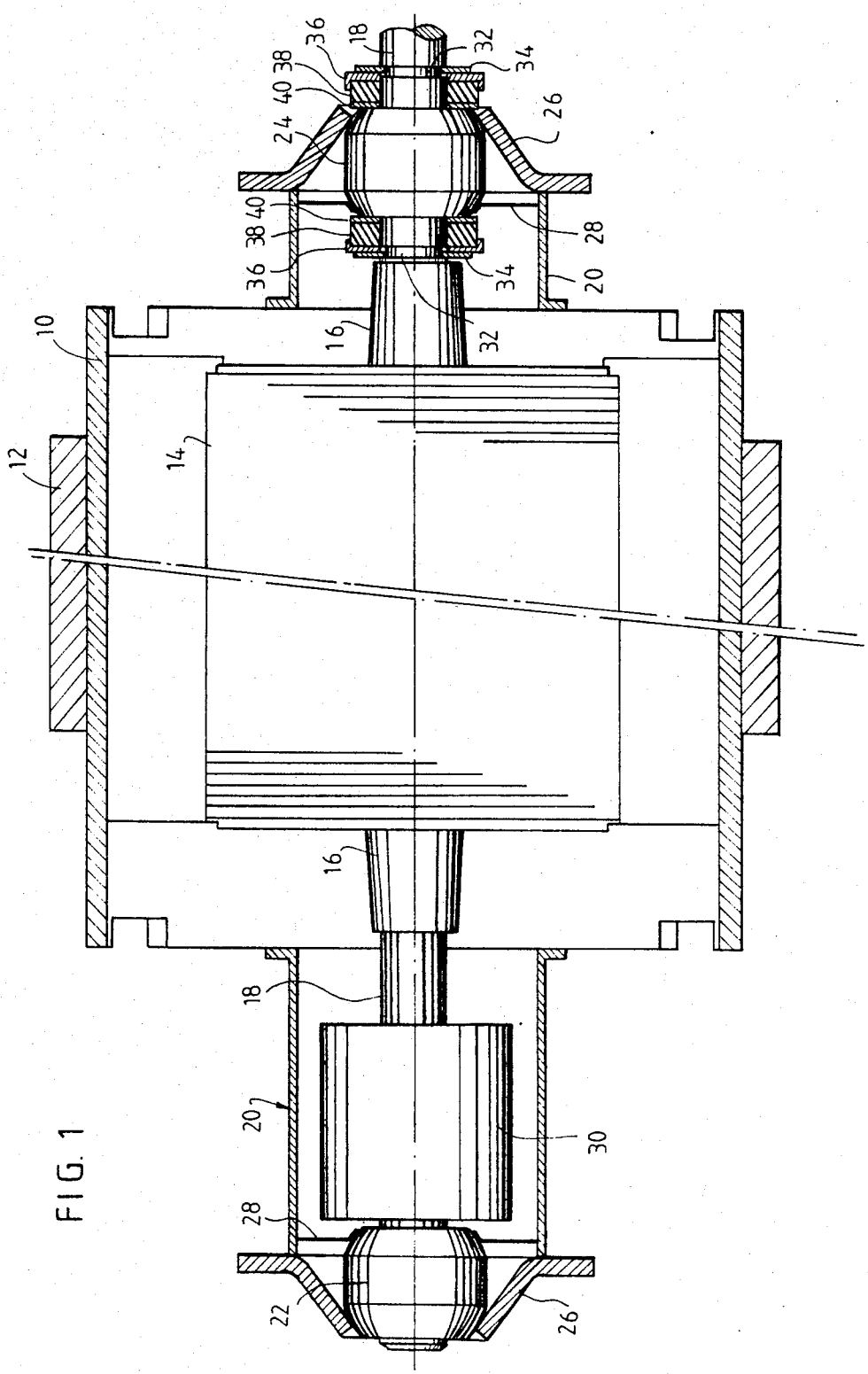
FIG. 1 is a diagrammatic longitudinal section through a portion of an electric motor whose shaft is fitted with a device in accordance with the invention.

Reference is now made to FIG. 1 which is a diagrammatic longitudinal or axial section through a portion of an electric motor in which the shaft is fitted with a positioning and play-compensating device in accordance with the invention.

In the example shown, the electric motor comprises a cylindrical field winding 10 surrounded on the outside by a reinforcing ring 12 and itself surrounding the motor armature 14 which is mounted on the cylindrical shaft 18 of the motor by means of insulating cheek pieces 16.

The shaft 18 is supported and guided for rotary motion by two swivel bearings 22 and 24 mounted at respective ends of the motor casing 20 which is shown very diagrammatically. Each bearing includes a support 26 in the form of an outwardly pointing truncated cone in which the swivel bearing per se 22 or 24 is received and is held in place by a flat spring 28 which is fitted to the casing 20 and which urges the swivel bearing into contact with the inside surface of the corresponding cone 26. The bearings 22 and 24 in which the shaft 18 is free to rotate are thus capable of automatically centering themselves relative to the supports 26 and the casing 20.

The shaft 18 is free to slide axially through one of the swivel bearings, and preferably through the bearing 22 which is at the collector ring (30) end of the motor, for reasons of compactness. At its other end, the shaft 18 is substantially fixed against axial motion relative to the bearing 24 by means of the device described below.

On either side of the bearing 24, the cylindrical outer surface of the shaft 18 has an annular groove 32, each of which has a resilient spring clip retention member or flat radially-split ring 34 which includes, in known manner, three claws or tabs pointing radially inwardly to press against the bottom of the groove 32 so that each spring clip 34 is fixed relative to the shaft both in rotation and in translation. Between each spring clip and the facing "front" face of the bearing there are in order: a metal washer 36, a cylindrical damping washer 38 of rubber or like material, and a friction washer 40 which presses against the front face of the bearing.

The metal washer 36 and the damping washer 38 are shown in greater detail in FIG. 5.

The metal washer 36 comprises a disk 42 having a central circular orifice 44 of slightly larger diameter than the diameter of the shaft 18 and a peripheral cylindrical rim 46 extending a short distance axially.

The flat disk 42 has raised portions 48 made by stamping for example, constituting projections extending axially in the same direction as the peripheral cylindrical rim 46. These raised portions are uniformly distributed around the axis of the disk 42 and they have rounded tops 50 connected to the adjacent disk 42 via convex rounded surfaces 52. As can be seen in FIGS. 3 and 4, the projections 48 extend slightly less far axially from the disk than does the surrounding rim 46.

The inside diameter of the cylindrical rim 46 is slightly greater than the outside diameter of the damping washer 38 of rubber or like material so that the damping washer can be received inside the rim 46 while being pressed against the tops of the raised portions 48 (see FIG. 5).

When devices in accordance with the invention are mounted on the shaft 18 on either side of the bearing 24, as shown in FIG. 1, any play which may result from slack manufacturing tolerances, is taken up by the projections 48 being pressed a corresponding amount into the rubber or like material of the damping washer 38. At the same time the damping washer is prevented from deforming radially by the surrounding rim 46 of the metal washer 36.

A lug 54 (FIG. 4) projects from the metal washer 36 parallel to its longitudinal axis and in the opposite direction to the peripheral rim 46. It may be made by cutting out a portion of disk 42 from next to its circular opening 44 and bending said portion back at 90°. When the device is assembled, the lug 54 engages in the radial slot of the spring clip 34 at thus fixes the metal washer against rotation relative to the spring clip.

The structure of the device is preferably symmetrical about the swivel bearing 24. However, in cases where there is very little play to be taken up, it is possible to have a metal washer 36 on one side only of the bearing 24, with the spring clip 34 on the other side being pressed directly against the damping washer 38.

In operation, when the shaft 18 is rotated, the spring clips 34, the metal washers 36, the damping washers 38 and the friction washers 40 rotate with the shaft 18, while the bearing 24 remains fixed against rotation relative to the motor casing. In known manner, the friction washers 40 are made of a plastic material such as a polyamide which includes molybdenum disulfide, to keep friction against the bearings relatively low.

The sizes of the various parts of the device are chosen in such a manner that, when the two grooves 32 in the shaft 18 are at a maximum distance apart in combination with the parts of the device at their minimum axial thicknesses, then the device as a whole provides axial tightening of a few hundredths of a millimeter so as to prevent the shaft having any axial play relative to the bearing. In contrast, even when the grooves are at a minimum distance apart in conjunction with parts of the device which are at their maximum thicknesses, the axial tightening remains less than 8/10ths of a millimeter which corresponds to the largest admissible tightening force on the bearing 24 for which the efficiency and the performance of the electric motor are substantially not reduced.

By way of example, when the damping washer 38 is 1 mm thick, the projections 48 extend about 0.5 mm from the disk 42.

By axially positioning the shaft 18 relative to the bearing 24, devices in accordance with the invention thus eliminate, or at least greatly reduce, vibration and noise generated by the motor when in operation.

I claim:

1. A positioning and play-compensating device for a shaft of an electric motor, said shaft being guided in a swivel bearing means held by the motor casing, said device including two resilient retention members fixed to the shaft on either side of the swivel bearing means together with at least one damping washer and friction washer interposed between the retention members and the swivel bearing, means the improvement wherein at least one metal washer is mounted on the shaft, free to move axially between a corresponding one of said resilient retention members and said damping washer of rubber-like material, and wherein the face of said axially-free metal washer which is in contact with said damping washer includes axially directed projections suitable for penetrating to a variable distance into the material of the damping washer.

2. A device according to claim 1, wherein said metal washer has a cylindrical rim around its periphery into which a portion of said damping washer is received.

3. A device according to claim 1, wherein said metal washer is fixed against rotation relative to at least one said resilient retention member by a lug which engages said resilient retention member.

4. A device according to claim 1, wherein said projections are carried by said metal washer, said projections including rounded tops and connected to said washer by convex surfaces.

5. A device according to claim 1, including on either side of said swivel bearing means one of said metal washers disposed between at least one respective resilient retention member fixed to the shaft and said damping washer of rubber-like material.

6. A device according to claim 1, wherein the other end of the shaft is guided in a second swivel bearing means mounted within the motor casing and through which the shaft is free to move axially as well as in rotation.

* * * * *